(12) United States Patent  (10) Patent No.: US 6,557,482 B1
Doty, III et al.                (45) Date of Patent:     May 6, 2003

(54) BIRD REPELLING ASSEMBLY

(76) Inventors: Arthur F. Doty, III, 7789 Russell Creek Rd., Edisto Island, SC (US) 29438; Robert M. Turkewitz, 720 Wildwood Rd., Charleston, SC (US) 29412; Ernest G. Byers, 918 W. Oceanview Rd., Charleston, SC (US) 29412

( * ) Notice: Subject to any disclaimer, the term of this patent is extended or adjusted under 35 U.S.C. 154(b) by 0 days.

(21) Appl. No.: 09/893,967

(22) Filed: Jun. 29, 2001

(51) Int. Cl.[7] ................................................ G10K 7/06
(52) U.S. Cl. .................... 116/22 A; 116/150; 116/22 R; 446/217
(58) Field of Search ............................ 116/22 A, 22 R, 116/67 R, 200, 202, 280, 147, 150; 446/213, 216, 217, 218

(56) References Cited

U.S. PATENT DOCUMENTS

| | | |
|---|---|---|
| 333,611 A | 1/1886 | Daveggio |
| 697,072 A | 4/1902 | Davis |
| 733,778 A | 11/1903 | Weber |
| 966,950 A | 8/1910 | Puha |
| 2,788,762 A | 4/1957 | Wright |
| 3,070,919 A * | 1/1963 | Peckham .................. 116/28 R |
| 3,292,319 A | 12/1966 | McCarthy |
| 3,374,763 A * | 3/1968 | Browning .................. 446/218 |
| 3,786,583 A * | 1/1974 | Revor .......................... 446/218 |
| 4,074,653 A | 2/1978 | Pember |
| 4,138,673 A * | 2/1979 | Faust ........................... 116/147 |
| 4,573,427 A | 3/1986 | Konzak |
| 4,649,853 A * | 3/1987 | Powell ........................ 116/147 |
| 4,656,770 A * | 4/1987 | Nuttle ........................ 116/22 A |
| 4,847,590 A * | 7/1989 | Gosswiller ................... 116/147 |
| 5,148,621 A | 9/1992 | Rosen |
| 5,196,961 A * | 3/1993 | Sun ............................. 116/202 |
| 5,241,777 A | 9/1993 | Looker et al. |
| 5,267,525 A * | 12/1993 | Person et al. ................ 116/202 |
| 5,341,759 A | 8/1994 | Hood |
| 5,343,651 A | 9/1994 | Chatten |
| 5,353,543 A | 10/1994 | Teraoka |
| 5,368,515 A * | 11/1994 | Mast ........................... 446/217 |
| 6,351,908 B1 * | 3/2002 | Thomas ..................... 116/22 A |
| 6,385,915 B1 * | 5/2002 | Keeler ....................... 116/22 A |
| 6,398,615 B1 * | 6/2002 | Wu et al. .................... 446/217 |

* cited by examiner

Primary Examiner—Diego Gutierrez
Assistant Examiner—Travis Reis
(74) Attorney, Agent, or Firm—Townsend M Belser, Jr.; Nexsen Pruet Jacobs & Pollard LLC

(57) ABSTRACT

An assembly for repelling birds from a selected area and having a rotor rotatably mounted on the distal end of a support member, the proximate end of which is fixed within the selected area. Fins and vents on the rotor are responsive to wind currents to rotate the rotor and generate bird repelling noises and visual effects. The fins may include light reflective and/or other design indicia.

16 Claims, 3 Drawing Sheets

BIRD REPELLING ASSEMBLY

TECHNICAL FIELD

The present invention relates to devices for discouraging the entry of birds into spaces where their presence is undesirable, and more particularly, to a rotating device for scaring birds away from an area in which their presence is undesirable.

BACKGROUND OF THE INVENTION

In coastal regions of the United States and other countries, marine craft, docks, aids to navigation and other marine structures suffer considerable damage and soilage from the droppings of sea gulls, terns, pelicans, cormorants and other birds. Similarly, communities near garbage dumps and land fills, which often attract large numbers of birds, may sustain similar soilage and damages, such as "white washed" rooftops.

Many devices, such as flags, plastic owls, snakes and other animals, noisemakers, deck sweepers and the like, have been tried in the past to deter birds from alighting on such structures. These prior art devices have had only limited success, at least in part because birds seem to become adapted to the presence of the device and then to ignore it.

SUMMARY OF THE INVENTION

The bird repeller of the present invention repels birds through a combination of sound, vibration and visual effects, which annoy the birds enough to prevent them from landing within 10–15 feet of the repeller. Furthermore, the almost constant variations in these effects prevent the birds from getting so use to the repeller that they come to ignore it over a period of time. Prototype testing suggests that one repeller would be effective to keep free of bird droppings an area of 300 square feet or more, and that, over an extended period of time, birds will stay as far away from the repeller as they did on the first day of installation. It is believed that birds do not get accustomed to the sound, vibration and visual effects of the device because these effects are constantly changing with the rotational speed of the rotor member, which varies with the changes in the driving wind velocity.

The bird repeller comprises a revolving hollow rotor that has laterally projecting fins adjacent to vents in a barrel section of the rotor. The fins are shaped and arranged to catch even the slightest breeze to create a wind turbine effect that spins the rotor on a vertical axis. As air currents of the wind pass across the fins and through the vents, they create a whirring sound that varies with the slightest change in the wind velocity. In addition to the whirring sound, a drum section of the rotor connects the barrel section to a neck of the rotor that rubs and vibrates against a vertical pole on which a head section of the rotor is rotatably mounted. Optionally, bells, clappers or other shakable noisemakers may be attached to an intermediate section of the pole, which also vibrates and shakes in response to the rubbing action of the rotor neck against the pole. The resulting noise and vibratory sounds also change constantly with the velocity of the wind.

In addition, the movement of the large projecting fins in the light of daytime is believed to cause a visual disturbance to the birds. This visual disturbance may be enhanced by the addition of holographic eyes or other designs on the fins, the designs being located preferably on the side of the fins in the direction of their rotation. The fin designs may also include a sparkling material capable of reflecting light in a flashing manner as the rotor rotates. The combination of the whirring and vibratory sounds with the visual effects of the spinning fins has the consequence of making birds sufficiently uneasy that they give a wide berth to the repeller.

Another advantage to the repeller of the invention is the simplicity of its construction. The rotor, which is preferably made of plastic, is mounted on a cap adhered to the top of a head portion of the vertical mounting pole and is secured to the head cap by a stainless steel screw via a nylon spacer that serves as a rotor bearing. This rotary mounting connection allows the rotor to rotate freely around the head portion of the pole. A proximate end portion of the mounting pole is held stationery by securely fastening it to any support structure, such as by clamped metal bands, bolts, or by simply slipping the base of the pole into a fishing rod holder on a boat, dock or other support structure.

By way of example, the rotor may be fashioned from a large inverted plastic juice bottle by cutting through the bottle material along three intersecting linear lines to form the three free edges of each fin and then bending the fin radially outward along the remaining proximate edge of the fin that forms a hinge by which the fin remains attached to the barrel section of the juice bottle rotor. A vent corresponding to each fin is formed when the cut-out for the fin is bent outward. The bottle from which the rotor may be made preferably has an upper tapered portion leading to the bottle neck, and this tapered portion forms an acoustic section of the rotor that enhances the vibratory sounds caused by the neck rubbing against the pole. In other words, the wall of the acoustic section resonates in response to vibrations caused by the rubbing action between the rotor neck and the pole.

The number and size of the fins and vents may vary widely, although 4 to 8 fins and vents are preferred, more preferably 6 for the rotor size described below. Although rectangular fins and vents are shown in the drawings by way of example, these elements may have other shapes and the fins and vents on the same rotor may have different sizes and shapes. A preferred rotor size is between 8 and 12 inches long and between 4 and 6 inches in diameter at the barrel so that the rotor is compact and can be easily stored in a small space, such as a storage cabinet on a boat, when it is not deployed in its active position on the mounting pole. The neck opening, which slips over the mounting pole, is preferably between about 1.25 and about 1.5 inches in diameter where the adjacent diameter of the mounting pole is about 1 inch. This gives a clearance of about 0.125 to about 0.25 inch between the neck and opposite sides of the mounting pole, which provides a preferred frequency of bird repelling vibrations. Where the overall length of the rotor is about 12 inches, the preferred lengths of the head, barrel, acoustic section and neck are respectively about 0.5 inch, about 6.5 inches, about 3.75 inches and about 1.25 inches. For a barrel of about 6.5 inches long and about 5.0 inches in diameter, the fins and vents are preferably about 2.75 inches long and about 1.75 inches wide, and the optimum number of fins and vents is 6.

Although the preferred material of the rotor is plastic, other materials may be used, such as steel, aluminum and other metals. Instead of nylon, the bearing washer may be made of Teflon® or stainless steel. The mounting pole may be made of hollow or solid plastic, wood or metal. The plastic may be PVC, the wood may be pine or oak, and the metal may be steel or aluminum.

The need for a bearing washer may be avoided by the rotary mounting structure employed in a second embodiment of the invention. In this embodiment, a lag-bolt type structure passes through and is secured to the head section of the rotor, with the shaft of the bolt projecting into the rotor along its rotational axis. The distal end of the bolt shaft rests freely in and rotates within a socket formed by a small metal or plastic cup that is mounted on the cap secured to the head of the vertical mounting pole. This second embodiment of the invention may have greater rotational wobble than the first embodiment, and thereby may produce a more effective vibratory sound by the rubbing action between the neck of the rotor and the mounting pole. The rotary connection may also have a longer wear life than the mounting screw and washer bearing of the first embodiment. However, the first embodiment may be mounted either upright, as shown in the drawings, or upside down with the proximate end of the mounting pole secured to an overhead mounting structure, whereas the second embodiment can only be mounted in an upright position.

The above features and benefits and the proven effectiveness of a prototype, combined with simplicity and low cost, make the bird repeller of the present invention significantly superior to any previously known repeller of the prior art.

BRIEF DESCRIPTION OF THE DRAWINGS

The invention, both as to its structure and operation, may be further understood by reference to the detailed description below, taken in conjunction with the accompanying drawings in which.

DETAILED DESCRIPTION OF PREFERRED EMBODIMENTS

Figure 1:
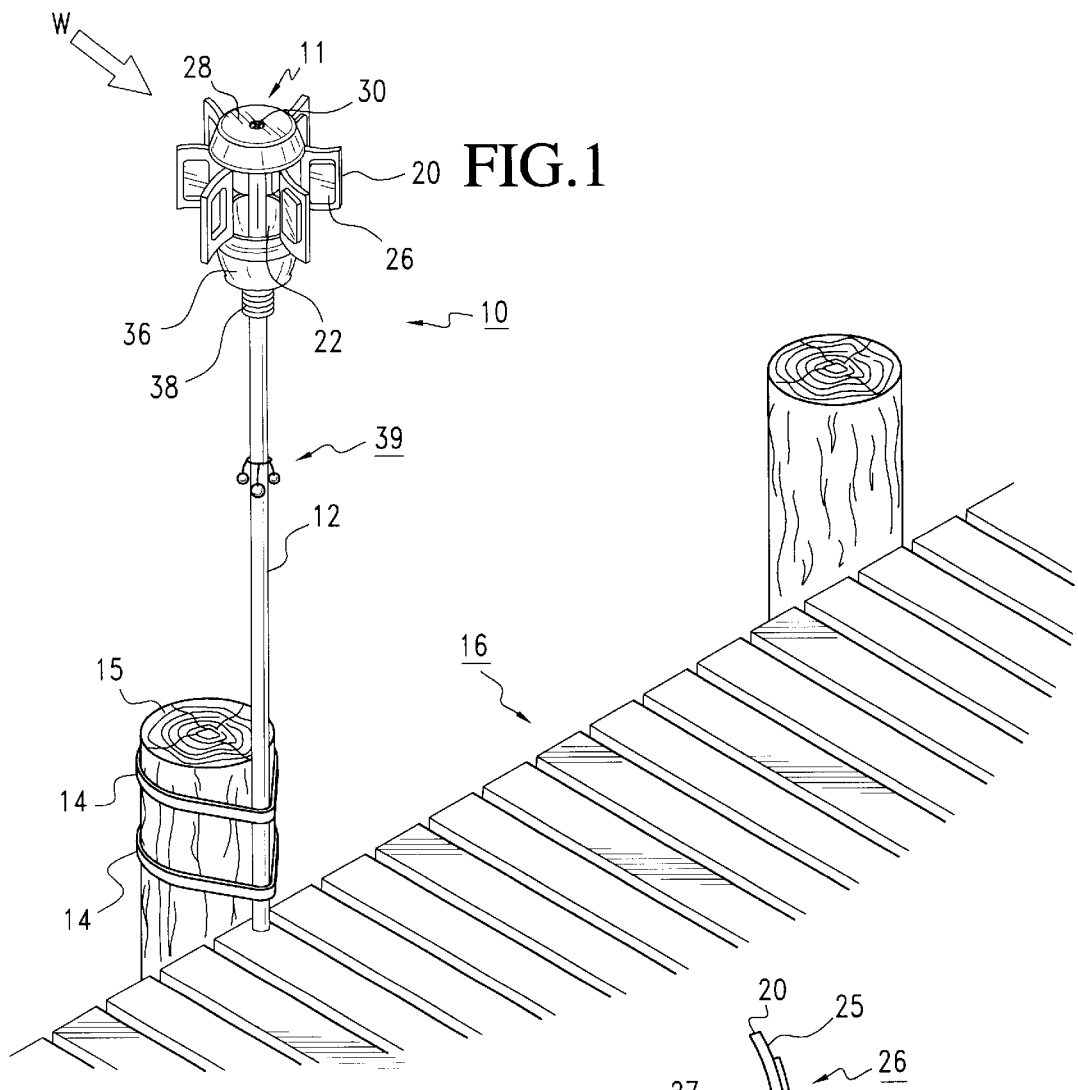
FIG. 1 is a prospective view illustrating installation of the invention on a dock to repel sea birds.

Referring to FIG. 1, there is shown a bird repeller assembly, generally designated 10, comprising a body 11, rotationally mounted on a pole or standard 12 secured by a pair of metal or plastic bands 14, 14 to the piling 15 of a dock 16. As may be seen best in FIGS. 2–4, a body 11 comprises a barrel sectionl 8 having a plurality of fins 20 each adjacent to a corresponding vent opening 22.

Figure 4:
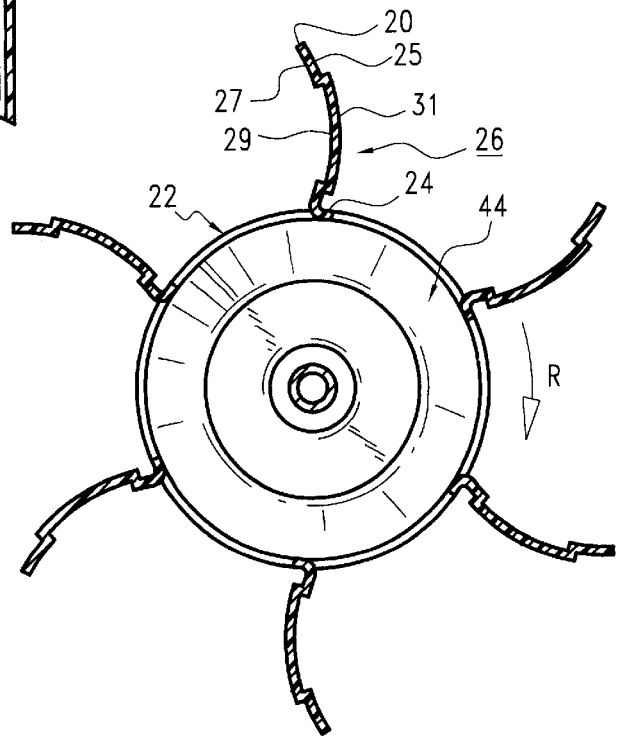
FIG. 4 is a cross-sectional view taken along lines 4—4 of FIG. 3.

Each fin 20 is attached to the barrel 18 by an elongated hinge segment 24 and preferably has a pressed out cup-like portion or indent 26 for enhancing the catching of a wind current or other air flow produced by the prevailing wind as represented by arrow W. The vents 22 are preferably formed by stamping or otherwise cutting out the fins 20 from the wall of barrel 18. The wind provides an air flow over the fins 20 which causes the body 11 to rotate in the direction of arrow R (FIG. 2) due to the concave curvature of the fin surface 27, and the convex curvature of the fin surface 25. This rotation is enhanced by the cupping action of the fin indent 26, which projects from the convex fin surface 25 in the rotational direction R and has a concave surface 29 and a convex surface 31 (FIG. 4).

A head section 28 above barrel 18 is rotatably secured to the top or distal end of pole 12 by a screw 30 that passes through a bearing washer 32 and is threaded into a cap 34 adhered to the distal end of the pole. Below the barrel 18 is an acoustic section 36 formed integrally with a neck 38 having accordion-like convolutions 40. The inner surface of the convolutions 40 form ridges 42 that rub against the pole 12 as the rotor body 11 rotates relative thereto. This rubbing action causes vibratory noise that is amplified by the acoustic section 36. As an optional feature, one or more shakable noisemakers, such as a plurality of bells 39, may be attached to the pole 12, which vibrates and thereby shakes the noisemakers to produce additional bird repelling noise in response to the rubbing action of the rotor neck against the pole.

The wind currents, which produce rotation of the rotor by impacting against the fins, also pass over the fins and through the vents 22 thereby generating a whirring noise. In other words, wind currents pass through the upwind vent openings oriented toward the wind arrow W and into the inner chamber 44 of the rotor 11, and then pass out of the chamber 44 through the downwind vent openings oriented away from the wind arrow W. This wind current air flow, in combination with rotation of the repeller body 11, is believed to be the source of the whirring noise observed during prototype testing.

Figure 5:
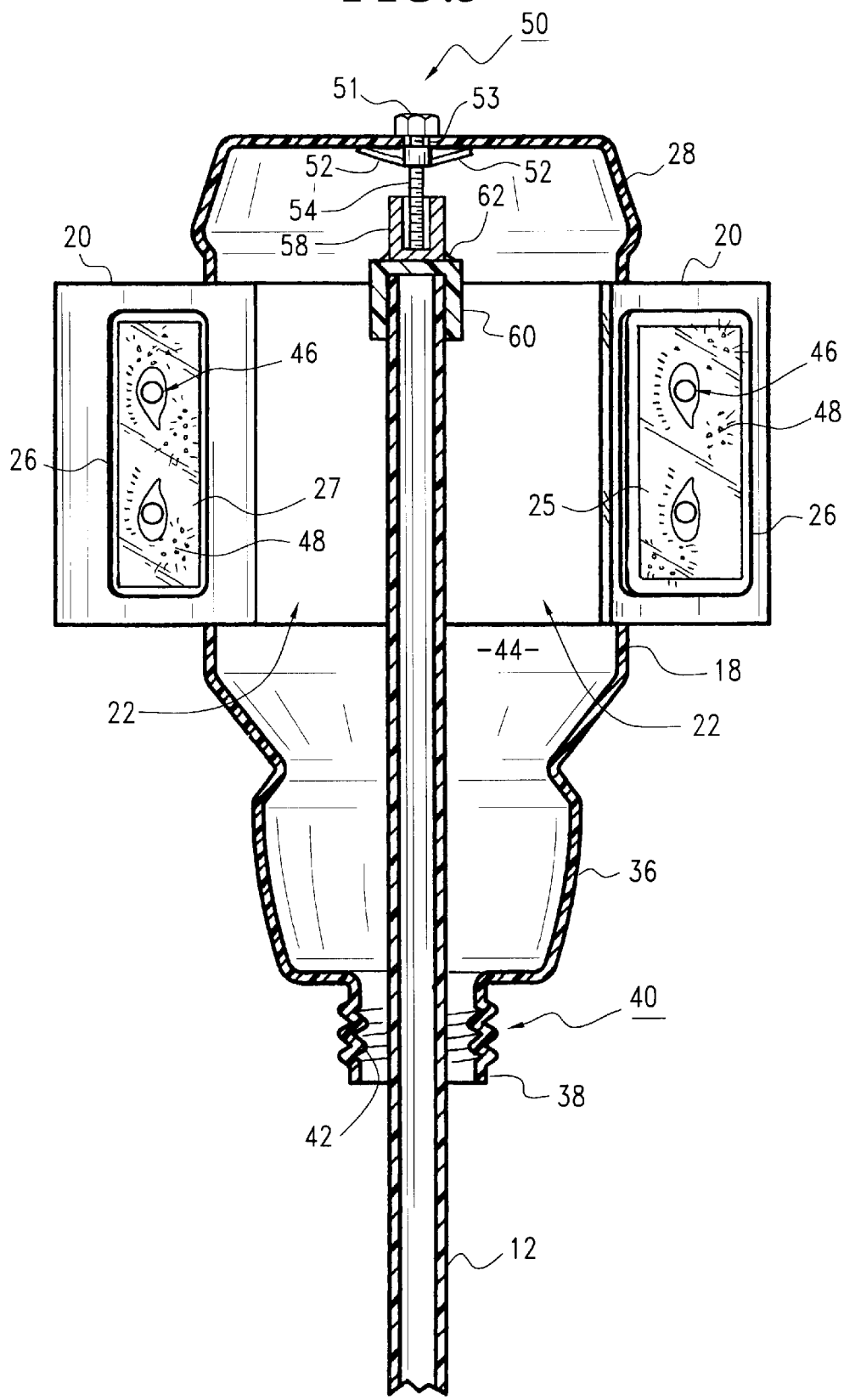
FIG. 5 is a fragmentary cross-sectional view in elevation of another embodiment of the invention.

Referring now to FIG. 5, there is shown a second embodiment of the invention wherein the same numeral part designations have been used to indicate structural elements identical with those shown in FIGS. 1–4. In the modified or second embodiment shown in FIG. 5, the rotary connection between the rotor body 11 and the top of the pole 12 is significantly different from that shown in FIG. 3.

In the second embodiment, a lag-bolt, generally designated 50, has a head 51 engaging the outer surface of head section 28, and a threaded shaft 54 that passes through the head section 28 and is secured thereto by a pair of anchor arms 52—52. The lag-bolt 50 is of conventional design wherein the arms 52—52 are initially folded so as to pass through an aperture 53 in the center of the head section 28, and then the arms 52—52 are expanded against the underside of the head section 28, as shown in FIG. 5, by rotation of the lag-bolt shaft 54 in response to rotation of its head 51 by a screwdriver, wrench or other conventional tool. After the lag-bolt is secured in the position shown, the neck 40 of the rotor is slipped over the top of the mounting pole and the rotor is lowered until the distal end of the bolt shaft 54 rests within and against the bottom of a cup 58 secured to a pole cap 60, such as by an adhesive 62 where the pole cap 60 is made of plastic, or by soldering or welding where the pole cap 60 is made of metal. As an alternative, the cup 58 and the pole cap 60 may be made of the same material and formed as a single-piece, integral structure.

When assembled as shown in FIG. 5, the distal end of lag-bolt shaft 24 rests on the bottom of cup 58 and the shaft rotates within the cup 58 and supports the rotor body 11 for rotation in response to the wind. The fins, vents, neck and remaining structure of the second embodiment function in the same manner as those of the first embodiment as described above. However, since the distal end of shaft 54 rests freely within the cup 58, the second embodiment may be operated only in an upright position such as that shown in FIG. 5, whereas the first embodiment may be operated either in an upright position, such as shown in FIG. 1, or in an inverted position, such as where the opposite or proximate end of pole 12 is secured to an overhead structure, e.g., a roof beam of a dock shelter, porch roof or the like.

Figure 2:
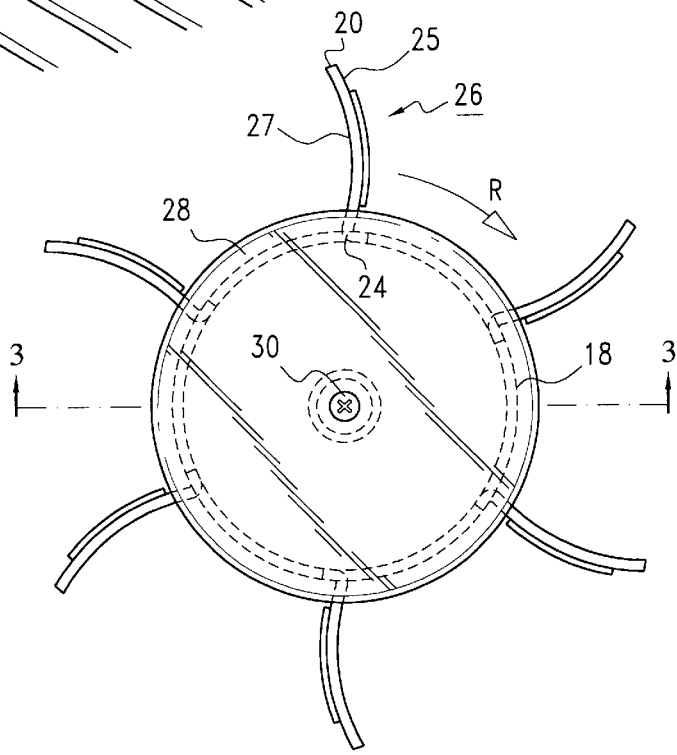
FIG. 2 is a plan view of the invention of FIG. 1.
Figure 3:
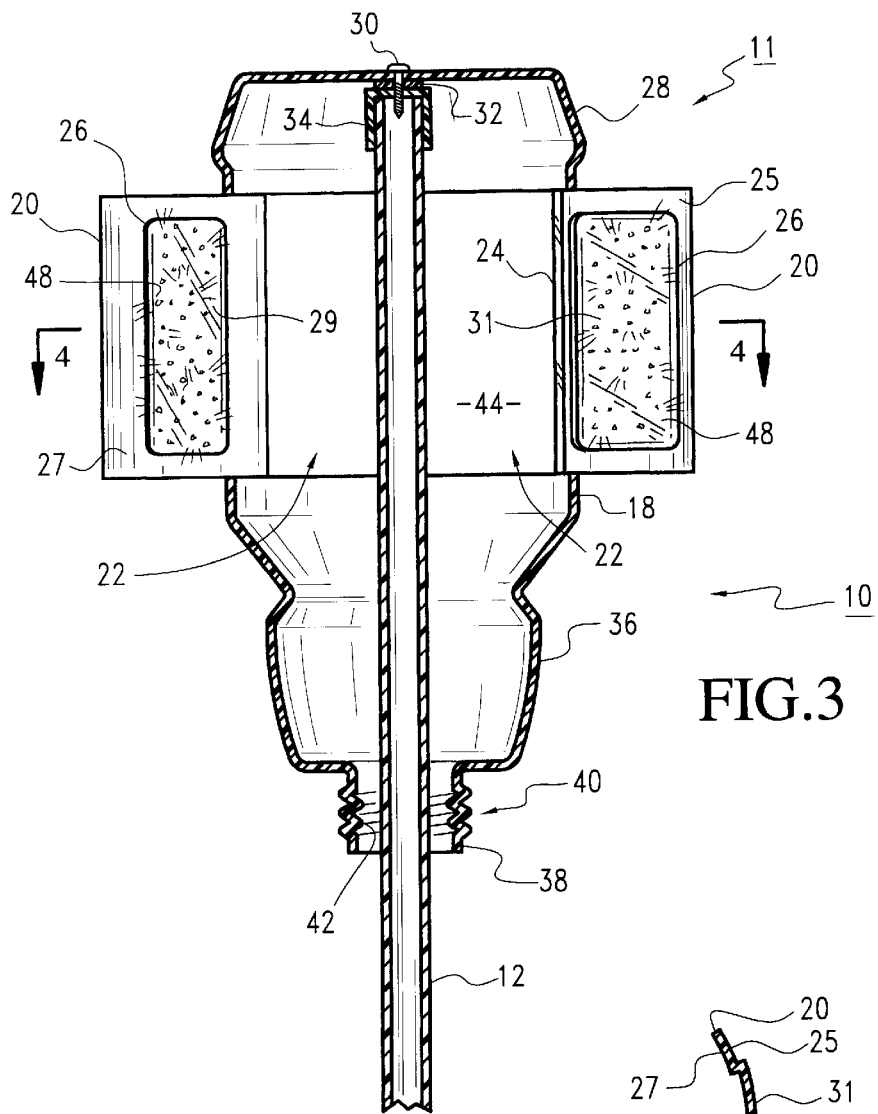
FIG. 3 is a fragmentary cross-sectional view of the invention in elevation taken along lines 3—3 of FIG. 2.

The bird disturbing visual effects provided by the spinning fins may be enhanced by placing designs, such as the holographic eyes 46 shown in FIG. 5, on one or both sides of one or more of the fins. The designs may include a light reflective material, such as sparkling particles 48, that reflect light in a flashing manner during rotation of the rotor in the presence of light. The reflective material also may be used without a design, as shown in FIG. 2, on one or both sides of one or more of the fins.

While specific bird repeller assemblies have been described and illustrated in detail, it will be apparent to those skilled in the art that many modifications and variations are possible without deviating from the broad scope of the present invention. For example, other types of rotary connections may be used to mount the head of the rotor on the distal end of the pole. In addition, the rotor and the pole may be made of a variety of materials, and the neck, acoustic section, barrel, head section, fins and vents may have a wide variety of shapes and sizes. Thus, the specific embodiment described herein is for the purpose of illustrating the present invention, and persons skilled in the art will recognize variations thereof that fall within the scope of this invention, which is limited only by the claims appended hereto, and the equivalence of the features described therein.

What is claimed is:

1. A repeller assembly for repelling birds from a selected area, said assembly comprising:
    an elongated support member having a proximate end portion adapted to be fixed within the selected area;
    a rotor comprising a hollow body having a barrel section with at least two vent apertures, and a neck section with an internal surface defining an opening for receiving a distal end portion of said support member, said opening and said distal end portion being sized to provide a clearance between the internal surface of the opening and an external surface of said distal end portion;
    at least one fin projecting from said barrel section and extending radially from an axis of said support member; and,
    mounting means for rotatably mounting said rotor on a distal end of said support member, said mounting means and said neck opening being arranged so that air flowing against said fin and through said apertures rotates said rotor with a wobble producing a rubbing action between the rotor neck and the support member that generates a vibratory sound for repelling birds from the selected area.

2. A repeller assembly according to claim 1, wherein said rotor comprises a plurality of said fins and said vents.

3. A repeller assembly according to claim 2, wherein each of said fins is arranged on said barrel section adjacent to a corresponding vent.

4. A repeller assembly according to claim 2, wherein there are six of said fins and six of said vents, each of said fins being arranged adjacent to a corresponding vent.

5. A repeller assembly according to claim 1, wherein there are at least three of said fins and at least three of said vents, each of said fins being arranged adjacent to a corresponding vent.

6. A repeller assembly according to claim 1, wherein said barrel section is connected to said neck section by an acoustic section of said rotor body, wherein a head section of said rotor body is rotatably mounted on the distal end of said support member, and wherein the distal end portion of said support member passes through said neck section, said acoustic section and said barrel section and said sections are arranged relative to each other such that said vibratory sound is amplified by said acoustic section.

7. A repeller assembly according to claim 1, wherein the internal surface of said neck section includes ridges that rub against said support member during rotor rotation.

8. A repeller assembly according to claim 1, further comprising a design indicia on at least one side of said fin.

9. A repeller assembly according to claim 8, wherein said design indicia includes a reflective material for providing a visual flashing effect when said rotor rotates in the presence of light.

10. A repeller assembly according to claim 1 further comprising on at least one side of said fin a reflective material for providing a visual flashing effect when said rotor rotates in the presence of light.

11. A repeller assembly according to claim 1, wherein said mounting means comprises a bearing element and a fastening element passing through a head section of said rotor body and through said bearing element, and wherein a distal end of said fastening element is fixed to the distal end of said support member.

12. A repeller assembly according to claim 1, wherein said mounting means comprises a shaft element secured to and projecting inward from a head section of said rotor body, and wherein a distal end of said shaft element rests freely within a cup member secured to the distal end of said support member, such that said shaft element and said rotor body rotate with said wobble relative to said cup member and said support member.

13. A repeller assembly according to claim 1, wherein said fin comprises an indented portion providing a concave surface and a convex surface on opposite sides of said fin, said convex surface being on a side of said fin toward which said rotor rotates in response to the air flow against said fin.

14. A repeller assembly according to claim 1 further comprising a shakable noisemaker attached to an intermediate portion of said support member and arranged to be shaken to produce a noise in response to vibration of said support member.

15. A repeller assembly according to claim 1, wherein said support member is hollow.

16. A repeller assembly according to claim 1, wherein said support member is solid.

* * * * *